US010370087B2

(12) United States Patent
López Ferrer et al.

(10) Patent No.: US 10,370,087 B2
(45) Date of Patent: Aug. 6, 2019

(54) PROPELLER DEVICE FOR AIRCRAFT, SPACECRAFT OR WATERCRAFT

(71) Applicant: Airbus Defence and Space S.A., Getafe (ES)

(72) Inventors: Jesús López Ferrer, Getafe (ES); Eugenio Garrido Corralejo, Getafe (ES)

(73) Assignee: AIRBUS DEFENCE AND SPACE S.A., Getafe (ES)

( * ) Notice: Subject to any disclaimer, the term of this patent is extended or adjusted under 35 U.S.C. 154(b) by 400 days.

(21) Appl. No.: 15/262,208

(22) Filed: Sep. 12, 2016

(65) Prior Publication Data
US 2017/0203831 A1 Jul. 20, 2017

(30) Foreign Application Priority Data

Sep. 11, 2015 (EP) .................................... 15382447

(51) Int. Cl.
*B63H 1/14* (2006.01)
*B63H 1/22* (2006.01)
*B63H 1/28* (2006.01)
*B64C 11/14* (2006.01)
*B64C 11/28* (2006.01)
*B64C 39/02* (2006.01)
*B63B 35/00* (2006.01)

(52) U.S. Cl.
CPC ................ *B64C 11/28* (2013.01); *B63H 1/14* (2013.01); *B63H 1/22* (2013.01); *B63H 1/28* (2013.01); *B64C 11/14* (2013.01); *B64C 39/024* (2013.01); *B63B 2035/009* (2013.01); *B63B 2748/00* (2013.01)

(58) Field of Classification Search
CPC ........... B64C 11/28; B64C 11/14; B63H 1/28; B63H 1/14; B63H 1/22; B63H 1/24; B63B 2748/00
USPC ...................................... 416/142; 244/16, 62
See application file for complete search history.

(56) References Cited

U.S. PATENT DOCUMENTS

| 2,198,475 | A |   | 4/1940  | Dorner |
|-----------|---|---|---------|--------|
| 2,500,382 | A |   | 3/1950  | Rowley |
| 2,848,054 | A |   | 8/1958  | Pearl  |
| 4,936,526 | A | * | 6/1990  | Gries ...................... B64C 11/28 244/53 R |
| 6,152,693 | A |   | 11/2000 | Olsen et al. |

(Continued)

FOREIGN PATENT DOCUMENTS

| DE | 2814586 A1 * | 10/1979 |
| DE | 3240995      | 5/1984  |

(Continued)

OTHER PUBLICATIONS

European Search Report, dated Feb. 12, 2016, priority document.

*Primary Examiner* — Igor Kershteyn
*Assistant Examiner* — Topaz L. Elliott
(74) *Attorney, Agent, or Firm* — Greer, Burns & Crain, Ltd.

(57) ABSTRACT

A propeller device for aircraft, spacecraft or watercraft comprising two or more blades and a spinner. The blades are arranged on a hub so that they can be in a deployed or a retracted position. The spinner comprises first, second and third movable portions configured for allowing deploying or retracting the blades and for keeping the blades deployed or retracted.

7 Claims, 3 Drawing Sheets

(56) References Cited

U.S. PATENT DOCUMENTS

| | | | |
|---|---|---|---|
| 6,550,719 B2 * | 4/2003 | Konig | B64C 11/28 244/16 |
| 7,886,544 B2 | 2/2011 | Koenig | |
| 2003/0034420 A1 | 2/2003 | Konig | |
| 2018/0334240 A1 * | 11/2018 | Paulson | B64C 27/50 |

FOREIGN PATENT DOCUMENTS

| | | |
|---|---|---|
| DE | 3240995 A1 * | 5/1984 |
| DE | 3246635 | 6/1984 |
| GB | 2365830 | 2/2002 |

\* cited by examiner

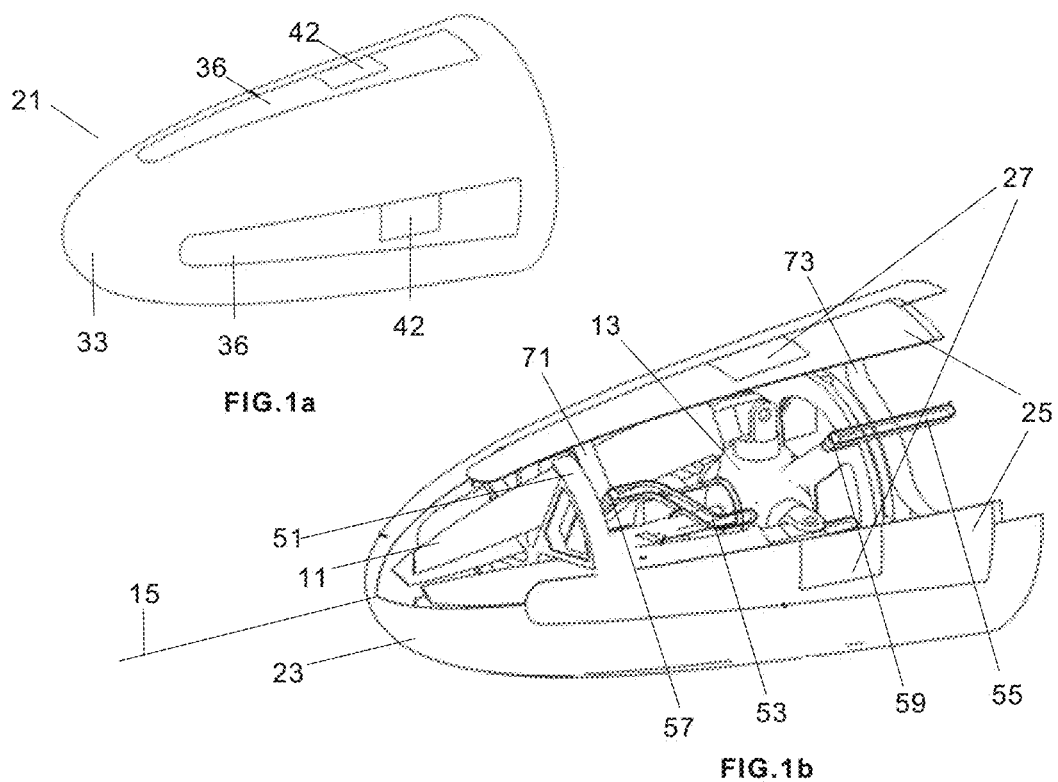
FIG.1a
FIG.1b
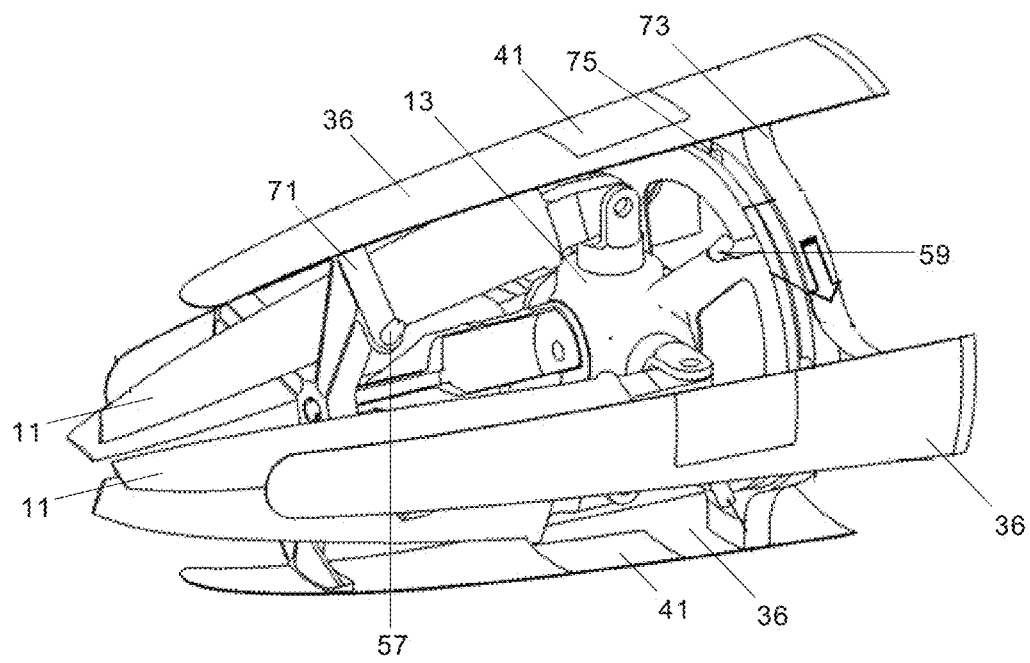
FIG.2

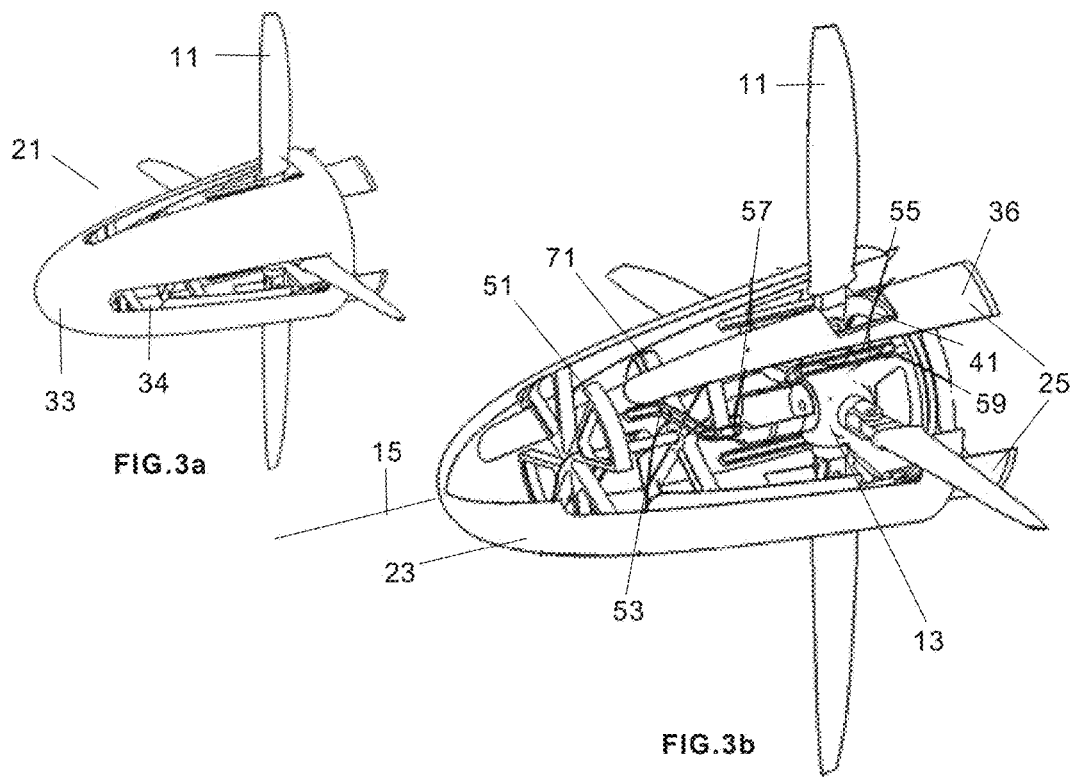

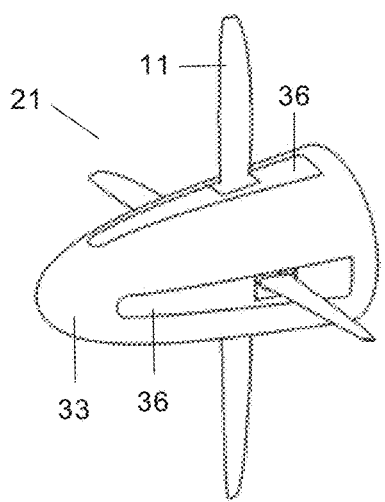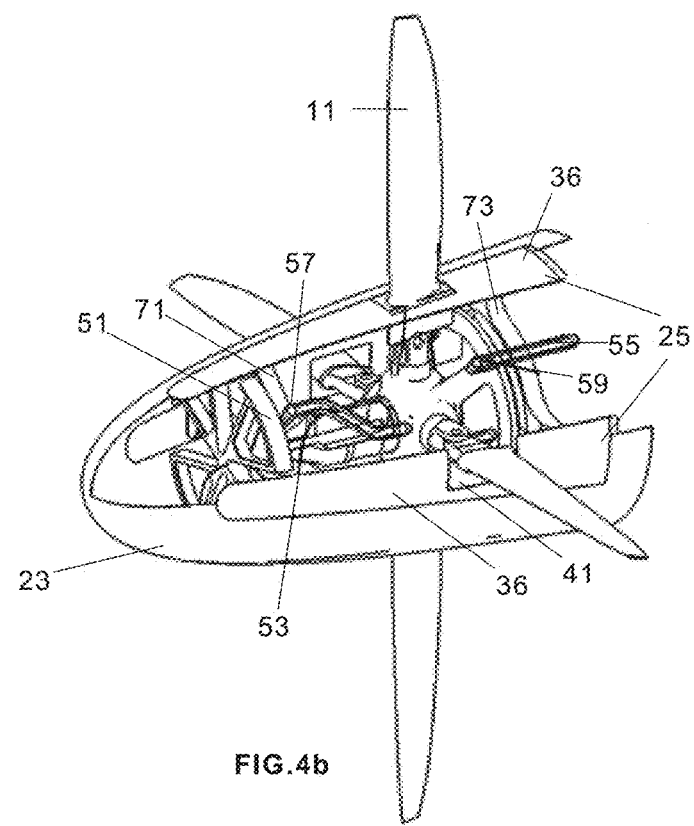
FIG.4a
FIG.4b

PROPELLER DEVICE FOR AIRCRAFT, SPACECRAFT OR WATERCRAFT

CROSS-REFERENCES TO RELATED APPLICATIONS

This application claims the benefit of the European patent application No. 15382447.9 filed on Sep. 11, 2015, the entire disclosures of which are incorporated herein by way of reference.

FIELD OF THE INVENTION

The present invention relates to propeller devices for aircraft, spacecraft or watercraft and, in particular, to propeller devices with deployable/retractable blades.

BACKGROUND OF THE INVENTION

There are different applications in the aeronautic industry in which a deployable propeller is foreseen, like Emergency Ram Air Turbines in commercial airplanes or self-motorized gliders. In commercial aircraft, an Emergency Ram Air Turbine is a system that allows getting power from external airstream in a multiple engine failure case deploying a propeller device from, usually, a dedicated fairing or pod. In the case of gliders, in order to avoid dependency from another engine powered aircraft for take-off, some solutions to deploy and/or to fold again the propeller in flight are known.

There are also applications in watercraft where a deployed propeller is desirable as for minimizing water drag in wing sailing boats and others.

In all the cases, the propeller needs to remain folded and hidden while it is not needed, in order to minimize the drag, and it is unfolded or deployed when required to allow for thrust.

Known solutions for folding and unfolding a propeller are described in U.S. Pat. No. 2,021,481 "Folding Propeller," U.S. Pat. No. 2,198,475 "Collapsible Propeller for Airplanes," U.S. Pat. No. 2,500,382 "Folding Propeller" and U.S. Pat. No. 6,152,693 "A Folding Propeller" dedicated to vessels and sailing ships.

U.S. Pat. No. 2,848,054 "Aeronautical Propeller Spinner" describes a ventilation system inside the spinner of a propeller device.

U.S. Pat. No. 7,886,544 B2 "Propeller or Propeller Drive" describes both propeller drives and folding propeller methods.

However, there are not known propeller devices for aircraft, spacecraft or watercraft able to deploy or retract the blades while moving in flight or water.

SUMMARY OF THE INVENTION

In one aspect, the invention provides a propeller device comprising two or more blades mounted on a hub connected to a driving shaft defining a longitudinal axis and a forward spinner (that will be also called, simply, spinner in this specification). The mounting arrangement of the blades on the hub is configured for arranging the blades whether in a deployed position or in a retracted position inside the forward spinner. The forward spinner comprises a first movable portion in the direction of the longitudinal axis and a second rotatory portion around the longitudinal axis from a closed position to an open position and vice versa that are configured for allowing deploying or retracting the blades and for keeping the blades deployed or retracted. The outer surface of the first movable portion comprises slots suitably dimensioned for allowing passage of the blades through them. The outer surface of the second rotatory portion is formed by first slot covers. The forward spinner further comprises a third rotatory portion around the longitudinal axis from a closed position to an open position with an outer surface formed by second slot covers.

In an embodiment, the first movable portion comprises a supporting frame and first and second guiding means cooperating with rolling devices placed in other spinner components to control its translational movement.

In an embodiment, the second rotatory portion comprises forward and rear supporting frames and cooperating rolling means.

In another aspect, the invention provides aircraft —including unmanned aerial vehicles (UAV's)—, spacecraft and watercraft with the propeller device.

Other desirable features and advantages of this invention will become apparent from the subsequent detailed description of the invention and the appended claims, in relation with the enclosed drawings.

BRIEF DESCRIPTION OF THE DRAWINGS

FIG. 1a is a perspective view illustrating the propeller device of the invention with the blades retracted inside the outer surface of the spinner and FIG. 1b is an enlarged view of FIG. 1a with one fourth of the outer surface of the spinner removed for clarity purposes.

FIG. 2 is the same view of FIG. 1b with the first movable portion of the spinner removed for clarity purposes.

FIG. 3a is a perspective view illustrating the propeller device of the invention with the blades being deployed and FIG. 3b is an enlarged view of FIG. 3a with one fourth of the outer surface of the spinner removed for clarity purposes.

FIG. 4a is a perspective view illustrating the propeller device of the invention with the blades fully deployed and FIG. 4b is an enlarged view of FIG. 4a with one fourth of the outer surface of the spinner removed for clarity purposes.

DETAILED DESCRIPTION OF THE PREFERRED EMBODIMENTS

This invention relates to a structure of the spinner 21 of a propeller device for aircraft, UAV's, spacecraft or watercraft that allows that the blades 11 can be deployed from a retracted position inside the forward spinner 21, in a longitudinal direction, to a deployed position and that they can be retracted from the deployed position to the retracted position. The blades 11 are mounted in a hub 13 connected to a motor or generator shaft (not shown in the Figures).

Typically, the spinner 21 has a so-called generic conical shape. It can also have the shape of a surface of revolution created by a curve that grows continuously with respect to the revolution axis.

The spinner 21 comprises first, second and third movable portions 23, 25, 27.

The outer surface 33 of the first movable portion 23 includes slots 34 (see FIG. 3a) to allow the deployment and retraction of blades 11, the outer surface of the second portion 25 is formed by first slot covers 36 to cover the slots 34 less the spaces 41 (see FIG. 3b) occupied by the blades 11 in their deployed position and the outer surface of the third movable portion 27 is formed by second slot covers 42 to cover the spaces 41.

The outer surface of the spinner 21 is, then, formed by the outer surfaces of the first, second and third movable portions 23, 25, 27 when the blades are retracted (see FIG. 1a) and by the outer surfaces of the first and second movable portions 23, 25 when the blades are deployed (see FIG. 4a).

The basic components of the first movable portion 23, in addition to the outer surface 33, are: a supporting frame 51 of the first movable portion, guiding means 53, 55 for controlling the translational movement in the direction of the longitudinal axis 15 and driving means to perform translational movement of the first movable portion (not shown in the Figures).

The basic components of the second movable (rotatory) portion 25, in addition to the first slot covers 36 forming an outer surface of the second movable portion, are forward and rear supporting frames 71, 73 of the first slot covers 36 as well as rolling means 75 and driving means (not shown in the Figures) to perform rotatory movement of the second movable portion.

The basic components of the third movable (rotatory) portion 27, in addition to the second slot covers 42 forming an outer surface of the third movable portion, are supporting frames and driving means (not clearly shown in the Figures) to perform the rotatory movement of the third movable portion.

The spinner 21 also comprises roller devices 57, 59 for cooperating with the guiding means 53, 55, placed, respectively, in the supporting frame 71 of the second movable portion 25 and in the hub 13. As the roller device 57 is placed in the second movable portion 25 the roller device serves to coordinate the translational movement of the first movable portion 23 with the rotatory movement of the second movable portion 25.

To allow the deployment/retraction of the blades 11, the first movable portion 23 will be moved in the direction of the longitudinal axis 15 and the second and (if appropriate) the third movable portions 25, 27 will be rotated around the longitudinal axis 15 from a closed position to an open position and vice versa. The movements allow that the blades 11 can pass through the slots 34 of the first movable portion 23 during their deployment/retraction because the first slot covers 36 of the second movable portion 25 are hidden inside the first movable portion 23 (see FIG. 3a).

Within the meaning of this invention, a closed position of the first, second and third movable portions 23, 25, 27 shall be understood as the rest position for each of the movable portions, and an open position as the position reached after activating the driving means of each of the movable portions.

In a deployment operation, the spinner 21 will change from a closed position with the blades 11 retracted inside the spinner 21 (see FIGS. 1a, 1b) to an open position (see FIGS. 3a, 3b) and, finally, to a closed position with the blades 11 deployed (see FIGS. 4a, 4b).

The extension of the translational movement of the first movable portion 23 can be easily appreciated comparing the position of the guiding means 53, 55 in the closed position of the first movable portion (see FIGS. 1b and 4b) and the open position (see FIG. 3b) of the first movable portion, as well as the separation between the movable supporting frame 51 of the first movable portion 23 and the rotatable supporting frame 71 of the second movable portion 25 in a closed and an open position.

Similarly, in a retracting operation, the spinner 21 will pass from a closed position with the blades 11 deployed to an open position and, finally, to a closed position with the blades 11 retracted inside the spinner 21. In that case, the third movable portion 27 only shall be moved from its open position to its closed position at the end of the operation.

An advantage of the invention is that allows to keep the blades 11 retracted inside the spinner 21 when they are not needed minimizing the drag and to deploy them when required, keeping aero or hydrodynamic properties as clean as possible.

The invention also allows retracting blades when not required for self-powered gliders in flight, as well as in the case of taking-off with their own means.

Another advantage is that the invention is applicable to pusher or puller type propeller devices.

Although the present invention has been described in connection with various embodiments, it will be appreciated from the specification that various combinations of elements, variations or improvements therein may be made, and are within the scope of the invention as defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propeller device comprising:
two or more blades mounted on a hub connected to a motor or to a generator by a shaft and
a forward spinner with an outer surface having the shape of a surface of revolution around a longitudinal axis in the direction of said shaft, wherein
the blades are mounted on the hub by a mounting arrangement configured to arrange the blades in a deployed position or in a retracted position inside the forward spinner;
the forward spinner comprising:
a first movable portion movable in the direction of the longitudinal axis and a second rotatory portion rotatable around the longitudinal axis from a closed position to an open position and vice versa wherein the first movable and second rotary portions are configured for allowing deploying or retracting the blades and for keeping the blades deployed or retracted; an outer surface of the first movable portion comprising slots suitably dimensioned for allowing passage of the blades through them; an outer surface of the second rotatory portion being formed by first slot covers for covering said slots, less the spaces allocated to the blades in their deployed position, when the second rotatory portion is in the closed position;
a third rotatory portion rotatable around the longitudinal axis from a closed position to an open position and vice versa wherein the third rotatory portion is configured to allow deployment or retraction of the blades and to keep the blades deployed or retracted; an outer surface of the third rotatory portion being formed by second slot covers to cover said spaces.

2. The propeller device according to claim 1, wherein the first movable portion comprises a supporting frame and first and second guiding means.

3. The propeller device according to claim 1, wherein the second rotatory portion comprises forward and rear supporting frames and cooperating rolling means.

4. The propeller device according to claim 3, wherein the roller means comprises a first roller device in the forward supporting frame of the second rotatory portion and a second roller device in the hub, the first and second roller devices cooperating with the first and second guiding means, respectively.

5. An aircraft or spacecraft comprising a propeller device comprising:
two or more blades mounted on a hub connected to a motor or to a generator by a shaft and
a forward spinner with an outer surface having the shape of a surface of revolution around a longitudinal axis in the direction of said shaft, wherein
the blades are mounted on the hub by a mounting arrangement configured to arrange the blades in a deployed position or in a retracted position inside the forward spinner;
the forward spinner comprising:
a first movable portion movable in the direction of the longitudinal axis and a second rotatory portion rotatable around the longitudinal axis from a closed position to an open position and vice versa wherein the first movable and second rotary portions are configured for allowing deploying or retracting the blades and for keeping the blades deployed or retracted; an outer surface of the first movable portion comprising slots suitably dimensioned for allowing passage of the blades through them; an outer surface of the second rotatory portion being formed by first slot covers for covering said slots, less the spaces allocated to the blades in their deployed position, when the second rotatory portion is in the closed position;
a third rotatory portion rotatable around the longitudinal axis from a closed position to an open position and vice versa wherein the third rotatory portion is configured to allow deployment or retraction of the blades and to keep the blades deployed or retracted; an outer surface of the third rotatory portion being formed by second slot covers to cover said spaces.

6. The aircraft or spacecraft according to claim 5, wherein the aircraft or spacecraft comprises an Unmanned Aerial Vehicle.

7. A watercraft comprising a propeller device comprising:
two or more blades mounted on a hub connected to a motor or to a generator by a shaft and
a forward spinner with an outer surface having the shape of a surface of revolution around a longitudinal axis in the direction of said shaft, wherein
the blades are mounted on the hub by a mounting arrangement configured to arrange the blades in a deployed position or in a retracted position inside the forward spinner;
the forward spinner comprising:
a first movable portion movable in the direction of the longitudinal axis and a second rotatory portion rotatable around the longitudinal axis from a closed position to an open position and vice versa wherein the first movable and second rotary portions are configured for allowing deploying or retracting the blades and for keeping the blades deployed or retracted; an outer surface of the first movable portion comprising slots suitably dimensioned for allowing passage of the blades through them; an outer surface of the second rotatory portion being formed by first slot covers for covering said slots, less the spaces allocated to the blades in their deployed position, when the second rotatory portion is in the closed position;
a third rotatory portion rotatable around the longitudinal axis from a closed position to an open position and vice versa wherein the third rotatory portion is configured to allow deployment or retraction of the blades and to keep the blades deployed or retracted; an outer surface of the third rotatory portion being formed by second slot covers to cover said spaces.

\* \* \* \* \*